United States Patent
Suzuki et al.

(10) Patent No.: US 7,209,194 B2
(45) Date of Patent: Apr. 24, 2007

(54) DISPLAY DEVICE HAVING METAL HEAT DIFFUSION MEMBER

(75) Inventors: Masahiko Suzuki, Mobara (JP); Keiichirou Ashizawa, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 21 days.

(21) Appl. No.: 10/733,267

(22) Filed: Dec. 12, 2003

(65) Prior Publication Data

US 2004/0141098 A1   Jul. 22, 2004

(30) Foreign Application Priority Data

Jan. 21, 2003   (JP)   ............................. 2003-012474

(51) Int. Cl.
  *G02F 1/1343*   (2006.01)
(52) U.S. Cl. .................... 349/55; 349/54; 349/141; 349/161; 349/192
(58) Field of Classification Search ................ 349/54, 349/55, 111, 141, 161, 192, 162
See application file for complete search history.

(56) References Cited

U.S. PATENT DOCUMENTS

| 5,852,485 A | 12/1998 | Shimada et al. |
| 5,963,279 A * | 10/1999 | Taguchi ........................ 349/54 |
| 6,195,140 B1 * | 2/2001 | Kubo et al. .................... 349/44 |
| 6,331,845 B1 * | 12/2001 | Kitajima et al. .............. 345/88 |
| 6,654,073 B1 * | 11/2003 | Maruyama et al. ........... 349/38 |
| 6,680,772 B2 * | 1/2004 | Lee .............................. 349/141 |
| 6,710,836 B2 * | 3/2004 | Lee .............................. 349/141 |
| 6,862,067 B2 * | 3/2005 | Matsumoto et al. ......... 349/141 |

* cited by examiner

*Primary Examiner*—Andrew Schechter
(74) *Attorney, Agent, or Firm*—Reed Smith LLP; Stanley P. Fisher, Esq.; Juan Carlos A. Marquez, Esq.

(57) ABSTRACT

A metal heat diffusion member is formed below a transparent electrode by way of an insulation film such that the metal heat diffusion member is superposed on the transparent electrode. The heat diffusion member includes a projecting portion at a portion thereof remoter than a distance between the heat diffusion member and a thin film transistor, and the heat diffusion member is superposed on the transparent electrode at the projecting portion.

2 Claims, 11 Drawing Sheets

DISPLAY DEVICE HAVING METAL HEAT DIFFUSION MEMBER

BACKGROUND OF THE INVENTION

1. Field of the Invention

The present invention relates to a display device, and more particularly to an active matrix type liquid crystal display device and a manufacturing method thereof which arrange a pair of pixel forming electrodes formed of strip-like or stripe-like transparent electrodes within a pixel area on an insulation substrate.

2. Description of the Related Art

As a flat panel type liquid crystal display device which can realize the high quality, a so-called lateral electric field type liquid crystal display device has been known. In the liquid crystal display device of this type, pixel circuits which have active elements such as thin film transistors (hereinafter referred to as "thin film transistors") on an insulation substrate (first insulation substrate) made of glass or the like are arranged in a matrix array, a strip-like or a stripe-like (hereinafter referred to as "strip-like") transparent first transparent electrode (a pixel electrode) which is driven by the thin film transistor and a strip-like transparent second transparent electrode (a common electrode) disposed close to the first transparent electrode are formed on the insulation substrate in the pixel circuit by way of an insulation layer, and an electric field which is approximately parallel to a surface of the insulation substrate is generated between the first and the second transparent electrodes in the pixel region so as to control the orientation of liquid crystal thus displaying images. The above-mentioned respective transparent electrodes are formed of a transparent conductive film such as ITO or the like. The first insulation substrate is laminated to a second insulation substrate not shown in the drawing which is preferably made of glass and the liquid crystal is sealed between both insulation substrates.

SUMMARY OF THE INVENTION

In the liquid crystal display device having the pixel structure which turns on the pixel using a pair of such transparent electrodes, when a short-circuit is generated between the neighboring first and second transparent electrodes (pixel electrode and common electrode) due to an electrode residue which is formed at the time of forming respective transparent electrodes, the pixel suffers from a point defect and loses a display function. To repair such a short-circuit by removing the short-cut, a method which cuts and separates the first and the second transparent electrodes by irradiating laser beams to the short-circuited portion is considered. In repairing the short-circuit of the transparent electrodes using the irradiation of the laser beams, since the transparent electrode has a low laser beam absorption efficiency with respect to the irradiated laser beams, it is difficult to perform the rapid cutting in many cases. On the other hand, when cutting is performed by increasing the intensity of laser beams, a temperature of a periphery of a portion to which the laser beams are irradiated is also elevated to a high temperature and hence, not only a region which is originally cut but also the insulation film below the transparent electrode including the peripheral portion is evaporated whereby desired repairing cannot be performed.

Figure 11A:
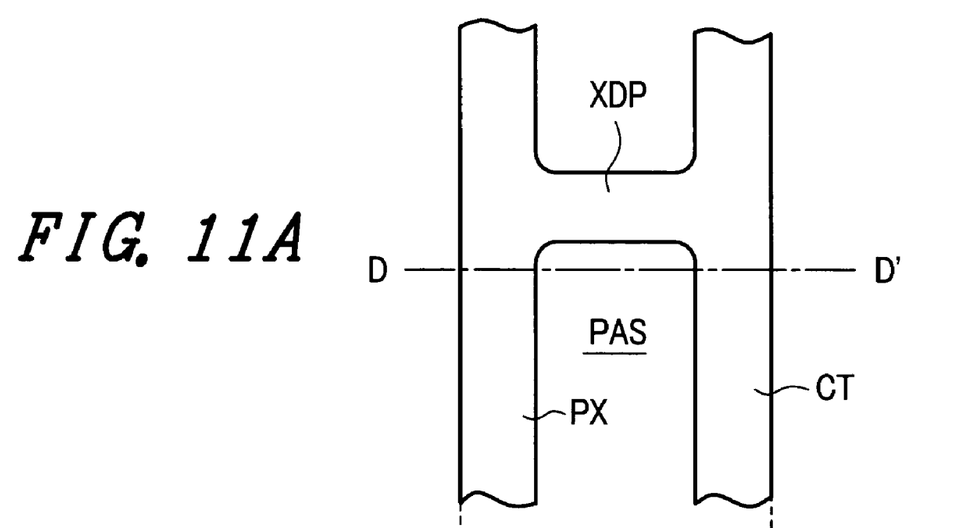
FIG. 11 is a schematic view explaining a short-circuited state between the transparent electrodes.
Figure 11B:
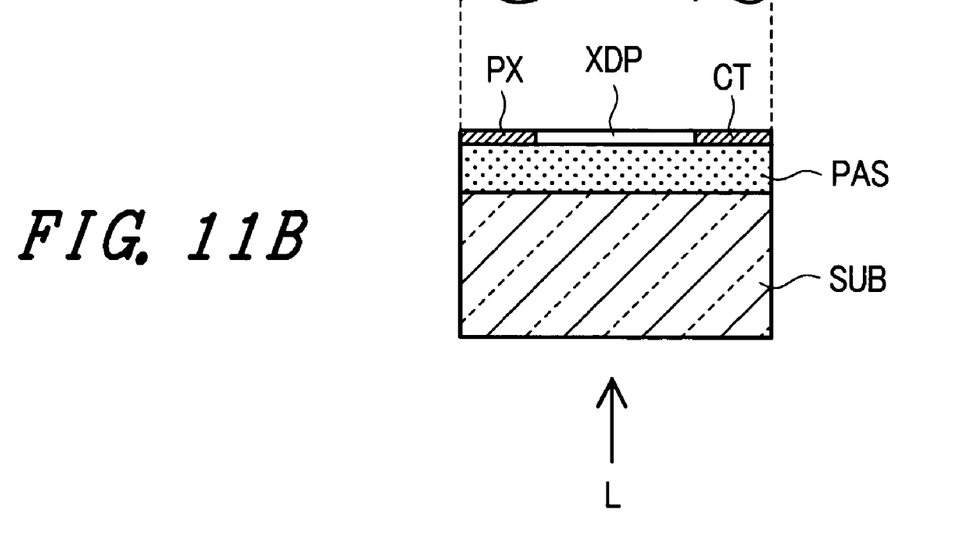
Figure 12A:
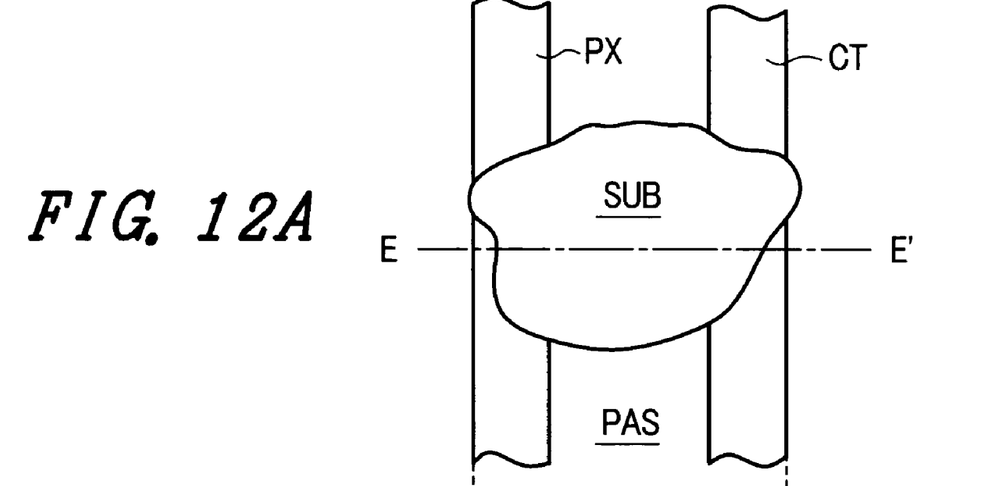
FIG. 12 is a schematic view for explaining the repairing operation of a short-circuit portion between transparent electrodes.
Figure 12B:
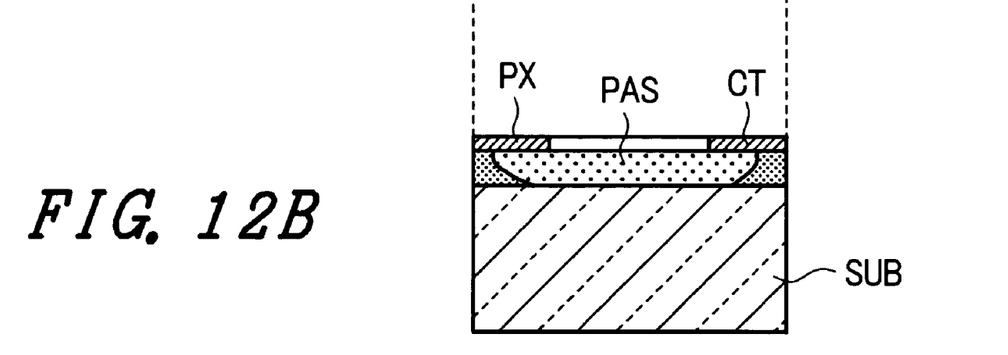

FIG. 11 is a schematic view showing a short-circuit state between the transparent electrodes, wherein FIG. 11(a) is a plan view and FIG. 11(b) is a cross-sectional view taken along a line D–D' in FIG. 11(a). Further, FIG. 12 is a schematic view showing a repairing operation of a short-circuit portion between the transparent electrodes, wherein FIG. 12(a) is a plan view and FIG. 12(b) is a cross-sectional view taken along a line E–E' in FIG. 12(a). As shown in FIG. 11, when a pixel electrode PX which constitutes a neighboring first transparent electrode and a common electrode CT which constitutes a second transparent electrode arranged close to the pixel electrode PX are short-circuited at a short-circuit portion XPD due to an electrode residue or the like, as shown in FIG. 12, upon irradiation of laser beams L with an intensity which can separate the short-circuit portion XPD from an insulation substrate SUB side, the short-circuit portion XPD is evaporated together with an insulation film PAS and hence, the pixel electrode PX and the common electrode CT are also removed whereby the pixel which has these pixel electrode PX and common electrode CT loses the pixel function and causes a point defect.

Further, there has been also known a liquid crystal display device having the electrode structure disclosed in U.S. Pat. No. 5,852,485, for example, in which transparent electrodes are formed on a metal film by way of an insulation film such that the transparent electrodes extend over a thin film transistor portion which constitutes an active element. When a repairing operation is performed with respect to the liquid crystal display device having such a pixel structure using the similar laser irradiation, since the metal film is non-transparent against the laser beams, it is possible to separate the transparent electrode made of ITO or the like which is formed as a layer above the metal film by the laser beam irradiation. However, it has been found out that heat generated by the laser irradiation reaches the thin film transistor after passing through the metal film and hence, a semiconductor film which constitutes the thin film transistor is degenerated and exhibits the characteristics different from the characteristics of other thin film transistors thus causing a point defect. This constitutes one of tasks to be solved in the repairing operation.

One advantage of the present invention lies in that in a liquid crystal display device in which a pair of strip-like transparent electrodes are arranged in parallel and close to each other on the same insulation substrate as electrodes for turning on a pixel, a short-circuit formed between the transparent electrodes can be repaired without giving an adverse influence to active elements such as thin film transistors and without inducing the evaporation of other constitutional layers or the intrusion of the short-circuit portion into liquid crystal whereby a yield rate of manufacture of products can be enhanced.

The above-mentioned advantage can be realized by constituting a liquid crystal display device which forms, for example, a plurality of thin film transistors arranged in a matrix array, a large number of scanning signal lines, a large number of data signal lines which intersect the scanning signal lines, common signal lines formed in pixel regions, first transparent electrodes which are arranged in parallel in each pixel region surrounded by the scanning signal lines and the data signal lines and constitute pixel electrodes which are connected to an output electrode of the thin film transistor, second transparent electrodes which are connected to the common signal lines and constitute counter electrodes which are formed close to the first transparent electrodes, and metal films which are superposed as a layer below the first transparent electrodes and the second transparent electrodes by way of an insulation film and to which a potential equal to a potential of the first transparent electrodes is applied on an insulation substrate, for example.

Then, on the above-mentioned metal films, wide-width portions which extend in the extending direction of the scanning signal lines and projecting portions which have a width narrower than a width of the wide-width portions and project in the extending direction of the data signal lines are formed, wherein the projecting portions have portions which are respectively superposed on the first transparent electrodes and the second transparent electrodes and, at the same time, a width of superposed portions is set wider than widths of the first transparent electrodes and the second transparent electrodes.

The projecting portion formed on the metal film has an area smaller than an area of the metal film and hence, a heat value of the projecting portion is small. In repairing a short-circuit between the first transparent electrode and the second transparent electrode, laser beams of low energy are radiated to the projecting portion from the insulation substrate side so as to cut and separate the short-cut portion by evaporating the short-circuit portion for every metal film. Further, by forming the projecting portion at a side remote from the thin film transistor, heat generated in the projecting portion due to the laser beam irradiation is diffused in the above-mentioned wide-width portion and hence, heat transmitted to the thin film transistor is largely reduced whereby it is possible to obviate the degeneration of the characteristics of the thin film transistor due to heat.

Further, in the present invention, an isolated metal film having a width wider than the width of the transparent electrode is provided in a state that the metal film is superposed on the first and the second transparent electrodes. In repairing a short-circuit between the first transparent electrode and the second transparent electrode, the transparent electrodes can be configured such that the transparent electrodes are cut and separated at this metal film portion by the laser beam irradiation in the same manner as the above-mentioned method. Also in this case, heat generated in the metal film by the laser beam irradiation is diffused in the above-mentioned wide isolated metal film and hence, heat transmitted to the thin film transistor is largely reduced whereby it is possible to obviate the degeneration of the characteristics of the thin film transistor due to heat.

Further, the present invention is configured such that projecting portions which are superposed on the first transparent electrodes and have a width wider than a width of the first transparent electrodes are formed on common signal lines and when a short-circuit between the first transparent electrode and the second transparent electrode is repaired, the transparent electrode is cut and separated at the metal film portion by the laser beam irradiation in the same manner as the above-mentioned method. Also in this case, heat generated in the metal film by the laser beam irradiation is diffused in the above-mentioned wide isolated metal film and hence, heat transmitted to the thin film transistor is largely reduced whereby it is possible to obviate the degeneration of the characteristics of the thin film transistor due to heat.

To explain further constitutions of the present invention, they are as follows.

(1) In a liquid crystal display device with thin film transistors, scanning signal lines, data signal lines which are arranged in a state that the data signal lines intersect the scanning signal lines, pixel electrodes which are connected to output electrodes of the thin film transistors, and common electrodes which form an electric field between the common electrodes and the pixel electrodes on one substrate out of a pair of substrates which are arranged to face each other with liquid crystal therebetween, in a pixel region which is surrounded by the neighboring scanning signal lines and the neighboring data signal lines, a metal heat diffusion member which is disposed in a spaced apart manner from the thin film transistor is provided, the heat diffusion member has a projecting portion at a portion thereof which is remoter than a distance between the thin film transistor and the heat diffusion member, and at least one of the projecting portions, the pixel electrodes and the common electrodes has superposed portions and at least one of the pixel electrodes and the common electrodes which are superposed on the projecting portions at the superposed portion is formed of a transparent electrode.

(2) In the constitution (1), a width of the projecting portions is equal to or wider than a width of the pixel electrodes or the common electrodes at portions which superpose the projecting portion.

(3) In the constitution (2), the pixel electrodes are formed of a transparent electrode and the heat diffusion members and the pixel electrodes are superposed each other at the projecting portions.

(4) In the constitution (3), the heat diffusing members are formed on the same layer as the output electrodes of the thin film transistors and the heat diffusion members and the pixel electrodes are connected with each other via through holes formed in the heat diffusion members.

(5) In the constitution (4), the liquid crystal display device includes common signal lines and the heat diffusion members are superposed on the common signal lines, and the projecting portions of the heat diffusion members project from the common signal lines.

(6) In the constitution (3), the heat diffusion members also function as common signal lines.

(7) In the constitution (2), the common electrodes are formed of a transparent electrode and the heat diffusion members and the common electrodes are superposed each other at the projecting portions.

(8) In the constitution (7), the liquid crystal display device includes common signal lines and the common signal lines also function as the heat diffusion members.

(9) In a liquid crystal display device forming thin film transistors, scanning signal lines, data signal lines which are arranged in a state that the data signal lines intersect the scanning signal lines, pixel electrodes which are connected to output electrodes of the thin film transistors, and common electrodes which form an electric field between the common electrodes and the pixel electrodes on one substrate out of a pair of substrates which are arranged to face each other with liquid crystal therebetween, in a pixel region which is surrounded by the neighboring scanning signal lines and the neighboring data signal lines, a metal heat diffusion member which is disposed in a spaced apart manner from the thin film transistor is provided, and the heat diffusion members are arranged in an isolated manner, and form superposed portions together with at least one of the pixel electrodes and the common electrodes.

(10) In the constitution (9), at least either one of the superposed pixel electrodes and common electrodes are formed of a transparent electrode.

(11) In any one of the constitutions (1) to (10), an inorganic insulation film and an organic insulation film are provided between a layer on which the heat diffusion members are formed and a layer on which electrodes which are superposed on the heat diffusion members are formed, and the organic insulation film has a removal portion at at least one portions of the superposed portions between the heat diffusion members and the electrodes.

Here, although other features of the present invention become apparent from the description of embodiments described later, it is needless to say that the present invention is not limited to these constitutions and various modifications can be made without departing from the technical concept of the present invention.

DETAILED DESCRIPTION

Hereinafter, embodiments of the present invention are explained in detail in conjunction with drawings showing the embodiments.

Figure 1A:
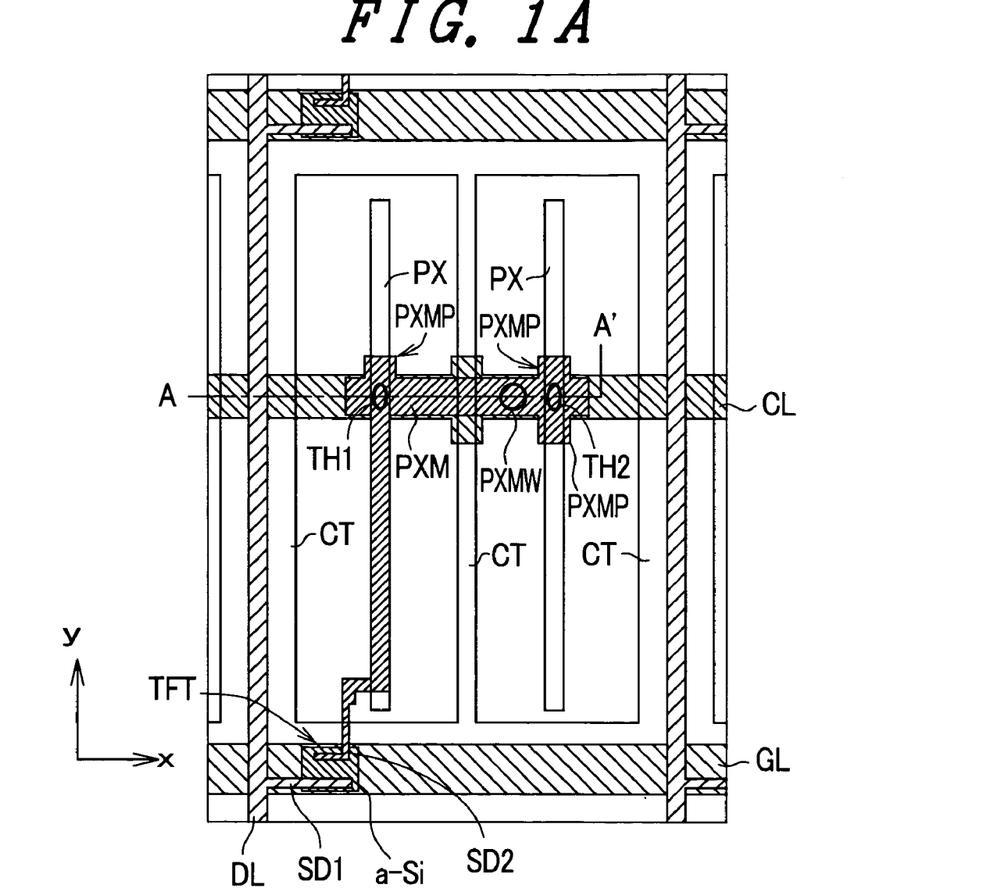
FIG. 1 is a constitutional view of the vicinity of one pixel for explaining an embodiment of a liquid crystal display device according to the present invention.
Figure 1B:
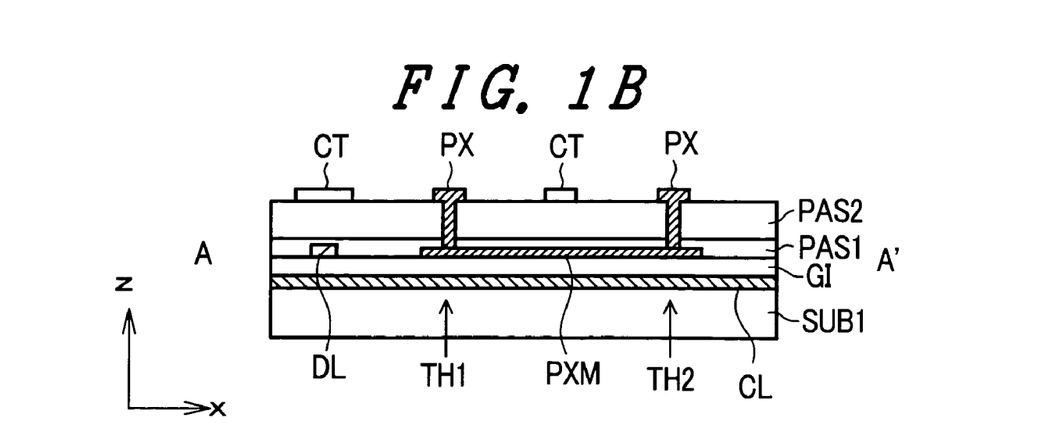

FIG. 1 is a constitutional view of the vicinity of one pixel for explaining a first embodiment of a liquid crystal display device according to the present invention, wherein FIG. 1(*a*) is a plan view and FIG. 1(*b*) is a cross-sectional view taken along a line A–A' in FIG. 1(*a*).

In FIG. 1, a plurality of thin film transistors TFT are arranged in a matrix array on an insulation substrate SUB1 which is preferably made of glass. A large number of scanning signal lines GL which apply selection signals to the thin film transistors are formed on the insulation substrate SUB1 such that the scanning signal lines GL extend in the first direction (hereinafter referred to as x direction) and are arranged in parallel in the second direction (hereinafter referred to as y direction) which intersects the x direction. Further, a large number of data signal lines DL which supply data signals to the thin film transistors TFT are formed such that the data signal lines DL extend in the y direction and are arranged in parallel in the x direction. Further, in each pixel region which is surrounded by the scanning signal lines GL and the data signal lines DL, a common signal line CL extending in the x direction are formed.

In the pixel region which is surrounded by the scanning signal lines GL and the data signal lines DL, first transparent electrodes (hereinafter referred to as pixel electrodes) PX which are connected to an output electrode (hereinafter referred to as a source electrode) of the thin film transistor TFT and second transparent electrodes (hereinafter referred to as common electrodes) CT which are connected to the common signal line CL and constitutes as a counter electrode againt the pixel electrode PX are formed in parallel. The common signal line CL which is connected to the common electrodes CT is provided to the pixel region.

Below the pixel electrodes PX, a metal film PXM to which an electric potential equal to the electric potential of the pixel electrode PX is applied is arranged by way of insulation films PAS1, PAS2 formed in an superposed manner. The metal film PXM is arranged as a layer above the common signal line CL and has a wide portion PXMW which extends along the extending direction of the scanning signal lines GL and projecting portions PXMP which project in the extending direction of the data signal line DL with a width narrower than a width of the wide portion PXMW. The projecting portions PXMP are superposed on the pixel electrodes PX and, at the same time, a width at the overlapped portion is wider than a width of the pixel electrodes PX. A plurality of (two in this embodiment) the pixel electrodes PX are connected to each other on the metal film PXM via through holes which penetrate the insulation films PAS1, PAS2.

Here, when the width of the pixel electrode PX (common electrode CT) is 10 µm, it is preferable that a projection length of the projecting portion PXMP is set equal to or less than 20 µm and a width thereof is set equal to or less than 20 µm. The reason is that the PXMP causes lowering of the numerical aperture.

In FIG. 1, the thin film transistor TFT is constituted of a drain electrode SD1 which extends from the data signal line DL, a source electrode SD2 which constitutes an output electrode and a semiconductor film (for example, an a-Si film), wherein the source electrode SD2 is connected to the pixel electrodes PX. Here, the gate electrode of the thin film transistor TFT is formed of the scanning signal line GL, while the data signal line DL and the metal film PXM are formed above the gate insulation layer GI by way of the gate insulation layer GI. Further, the pixel electrode PX is connected to the metal film PXM via through holes TH1, TH2. The insulation substrate SUB1 is usually called as the thin film transistor substrate and, a color filter substrate (SUB2) as a second substrate which is not shown in the drawing is arranged to face the insulation substrate SUB1 in an opposing manner. A liquid crystal layer is sealed between these substrates.

Figure 2:
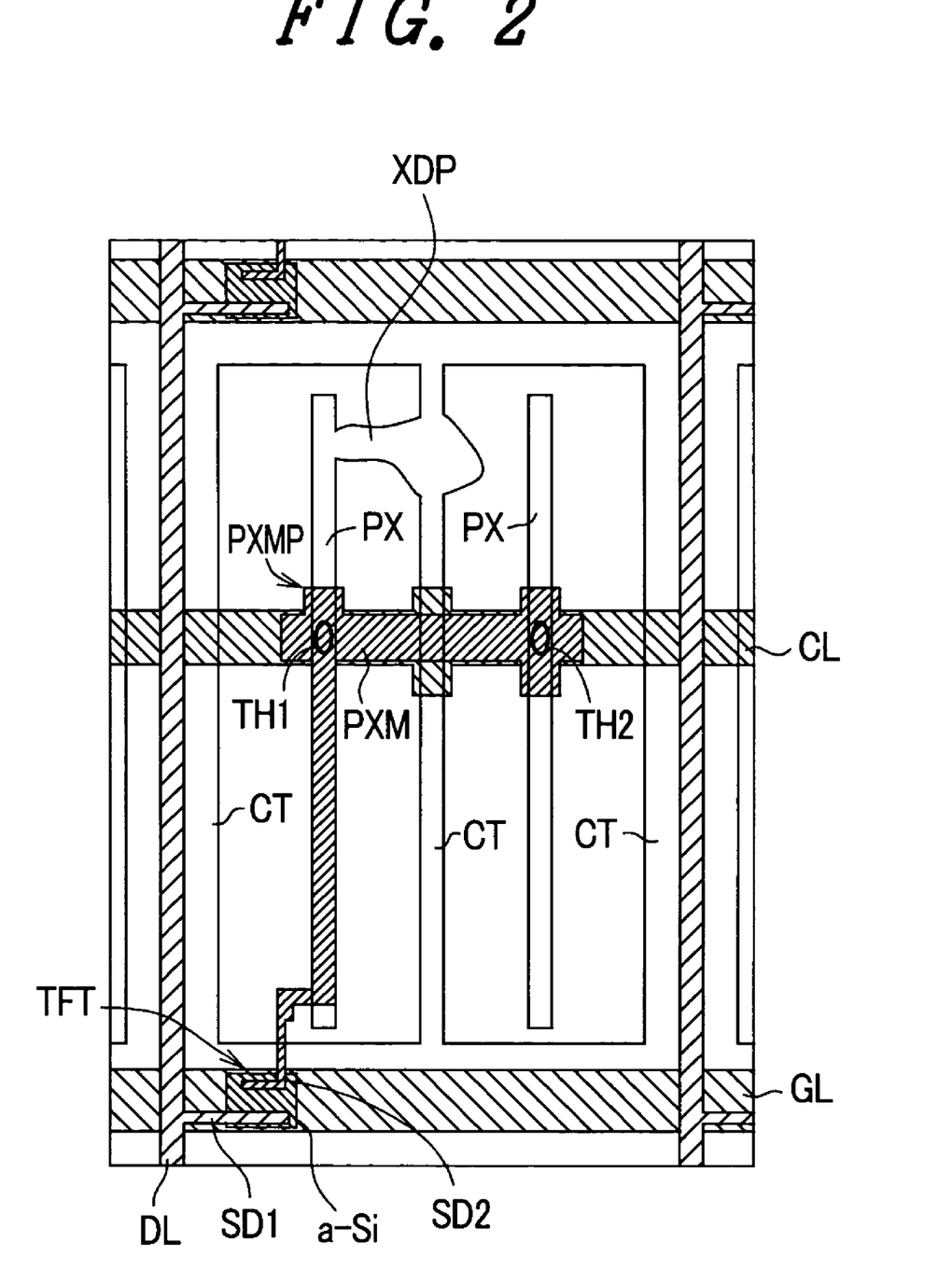
FIG. 2 is an explanatory view of a short-circuit repairing step of an embodiment of the present invention.
Figure 3:
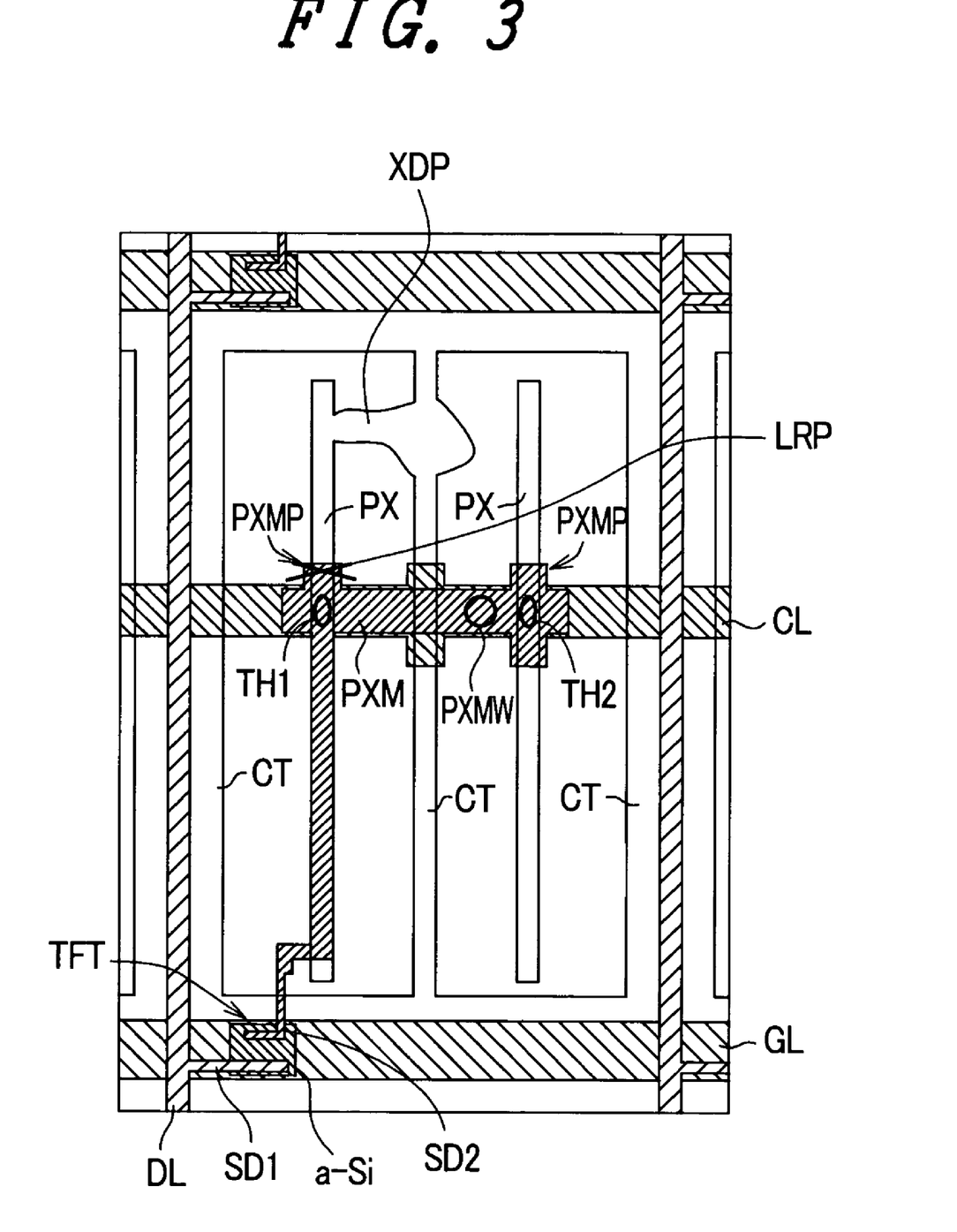
FIG. 3 is an explanatory view of a short-circuit repairing step of an embodiment of the present invention.
Figure 4:
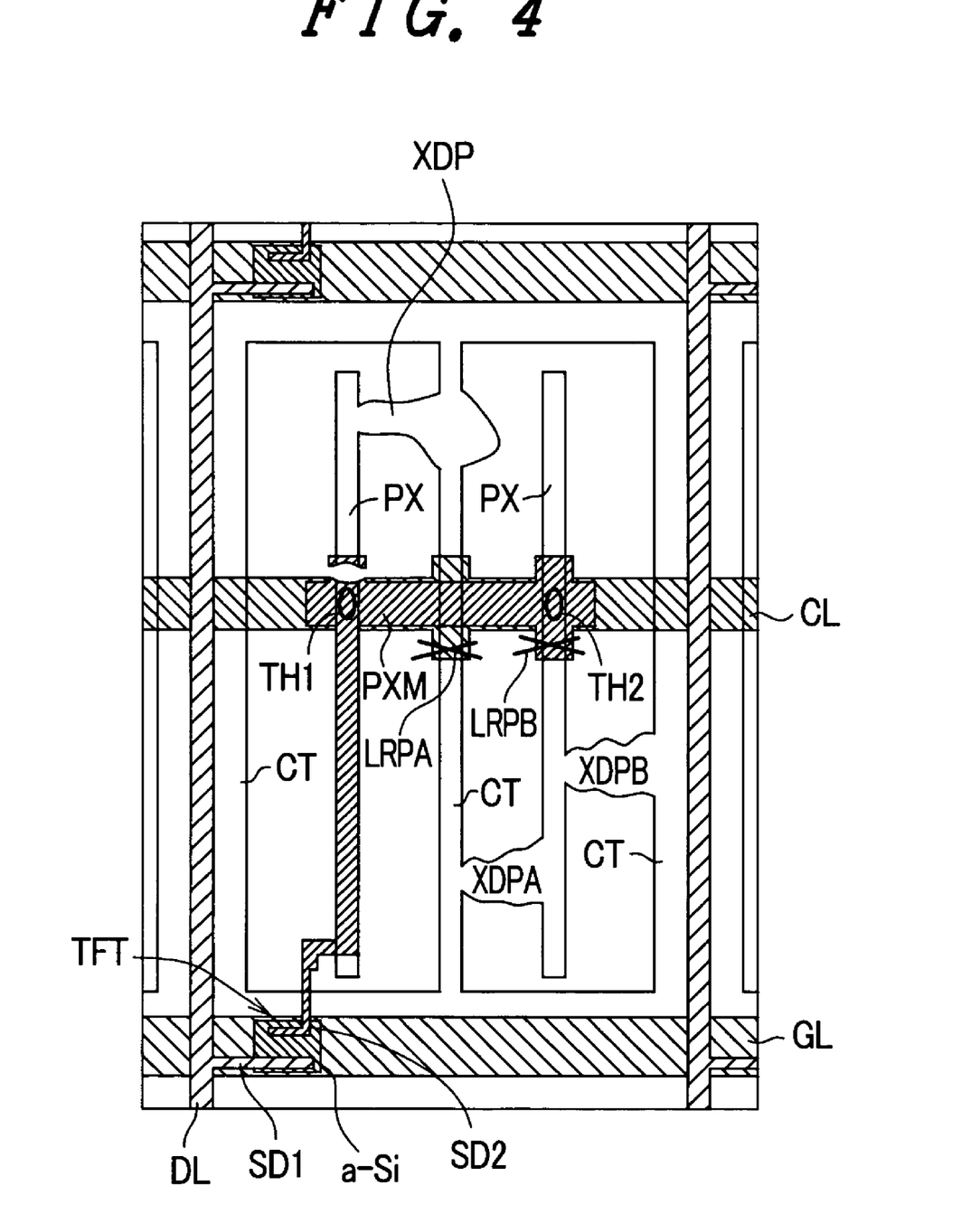
FIG. 4 is an explanatory view of a short-circuit repairing step of an embodiment of the present invention.

FIG. 2 to FIG. 4 are explanatory views of short-circuit repairing steps according to the first embodiment of the present invention. Here, as shown in FIG. 2, it is assumed that the pixel electrode PX which is connected to the source electrode SD2 of the thin film transistor and extends directly to the pixel region and the common electrode CT which is arranged close to the pixel electrode PX are short-circuited at a short-circuit portion XDP due to an electrode residue when the pixel electrode and the common electrode are formed. To repair this short-circuit, laser beams are irradiated to a laser beam irradiation position LRP at the projecting portion PXMP of the metal film PXM which is indicated by "x" in FIG. 3. The laser beam irradiation position LRP is arranged at a side remote from the thin film transistor TFT with respect to the metal film PXM. The intensity of energy of the laser beams is set at a level that the laser beams do not evaporate the insulation film which constitutes the lower layer. That is, with the irradiation of the laser beams having such intensity of energy, the pixel electrodes PX which are superposed on the metal film PXM by way of the insulation films PAS1, PAS2 (see FIG. 1) are evaporated and cut together with the metal film PXM and the pixel electrodes PX are separated from the common electrodes CT. The state after such cutting and separating operation is shown in FIG. 4.

Due to such repairing operation, although a portion of the pixels (a portion which is constituted of a separated portion of the pixel electrode PX and the common electrode CT hanging the short-circuit portion XDP) no more contributes for the display, to consider the pixel electrodes as whole, it is possible to turn on and off the pixel electrodes. That is, the pixel electrodes can recover a state in which the pixel electrodes can perform the original function of lighting/extinction from a state of a point defect in which the pixel electrodes cannot be turned on and off as a whole.

Figure 5:
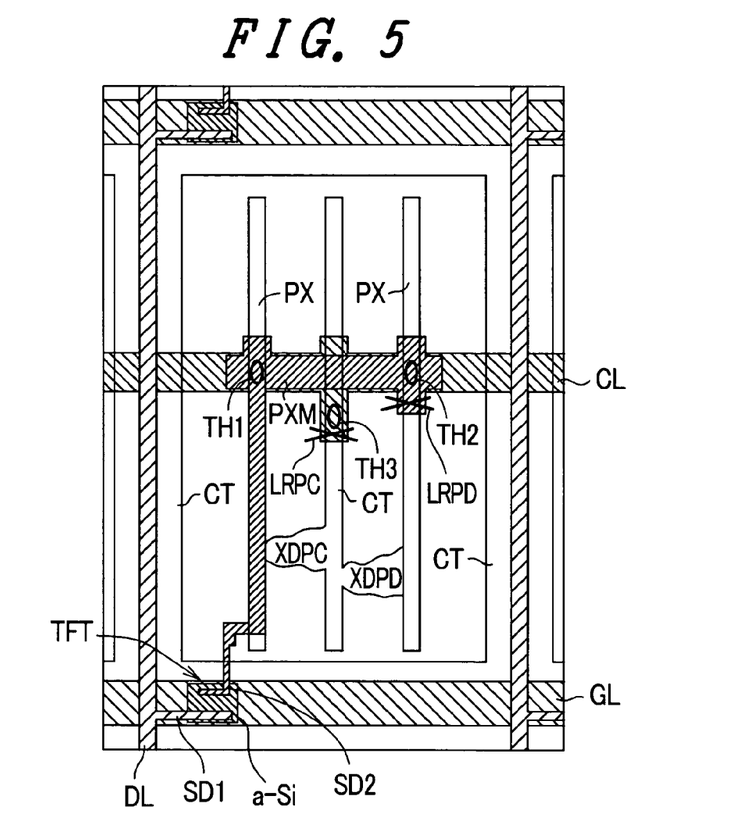
FIG. 5 is a constitutional view of the vicinity of one pixel for explaining another embodiment of the liquid crystal display device according to the present invention.

Further, there may be a case in which other portions in FIG. 4 are short-circuited. For example, the pixel electrodes PX which are connected to the metal films PXM via the through hole TH2 and the common electrode CT which is disposed at the center of the drawing are short-circuited at a short-circuit portion XDPA. In this case, it is possible to perform the similar repairing operation by separating the pixel electrodes PX and the common electrode CT at a laser beam irradiation position LRPA. Further, when the pixel electrode PX which is connected to the metal films PXM via the through hole TH2 and the common electrode CT which is disposed at the right end of the drawing are short-circuited at a short-circuit portion XDPA, it is also possible to perform the similar repairing operation by separating the pixel electrodes PX and the common electrode CT at a laser beam irradiation position LRPB, FIG. 5 is a constitutional view of the vicinity of one pixel for explaining a second embodiment of the liquid crystal display device according to the present invention. In the liquid crystal display device of this embodiment, the common electrode CT which is disposed at the center of the pixel is formed independently from the common electrodes arranged at both left and right sides of the pixel and is connected to a through hole TH3 at the projecting portion formed on the common signal line CL. Also in the liquid crystal display device having such a constitution, the repairing can be similarly performed when the short-circuit is generated at positions similar to the positions in FIG. 3. That is, when a short-circuited portion XDPC and a short-circuit portion XDPD are formed at positions shown in FIG. 5, the repairing can be performed by separating the center common electrode CT at a laser irradiation position LRPC and by separating the pixel electrode PX of the right side at a laser irradiation position LRPC. Further, even when the short-circuit is generated at positions other than the positions shown in the drawing, by performing the laser irradiation at a position on the projecting portion of the metal film PXM or at a position on the projecting portion formed on the common signal line CL, the repairing can be performed by irradiating laser beams with weak energy. Further, by combining the repairing steps shown in FIG. 1 to FIG. 4 and the repairing step shown in FIG. 5, one, two or more short-circuits can be repaired.

Figure 6:
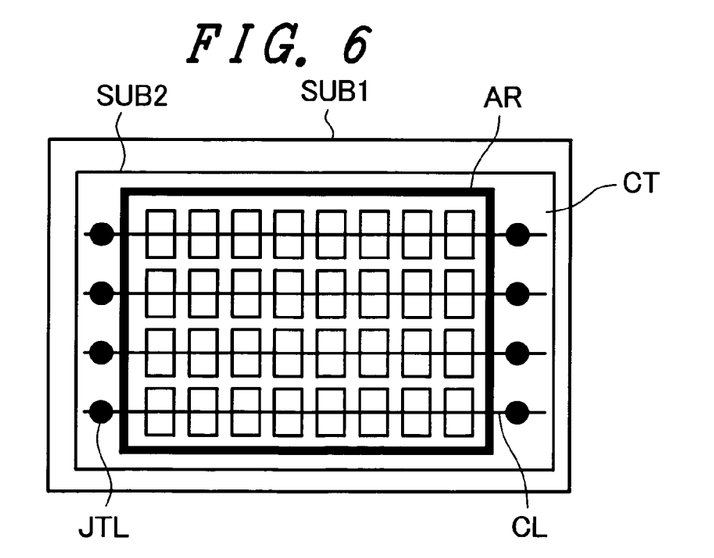
FIG. 6 is a schematic plan view explaining another example of the constitution of a connection mode of a common electrode and a common signal line.

FIG. 6 is a schematic plan view for explaining another constitutional example of the connection state between the common electrodes and the common signal lines. In this constitution, the common signal lines and the common electrodes CT formed on the insulation substrate SUB1 are connected with each other through connection portions JTL which are positioned in a laminated region of the insulation substrate SUB1 and another insulation substrate (color filter substrate) SUB2 outside the display region AR. Accordingly, a through-hole forming step is no more necessary and hence, the manufacturing step can be simplified.

Figure 7A:
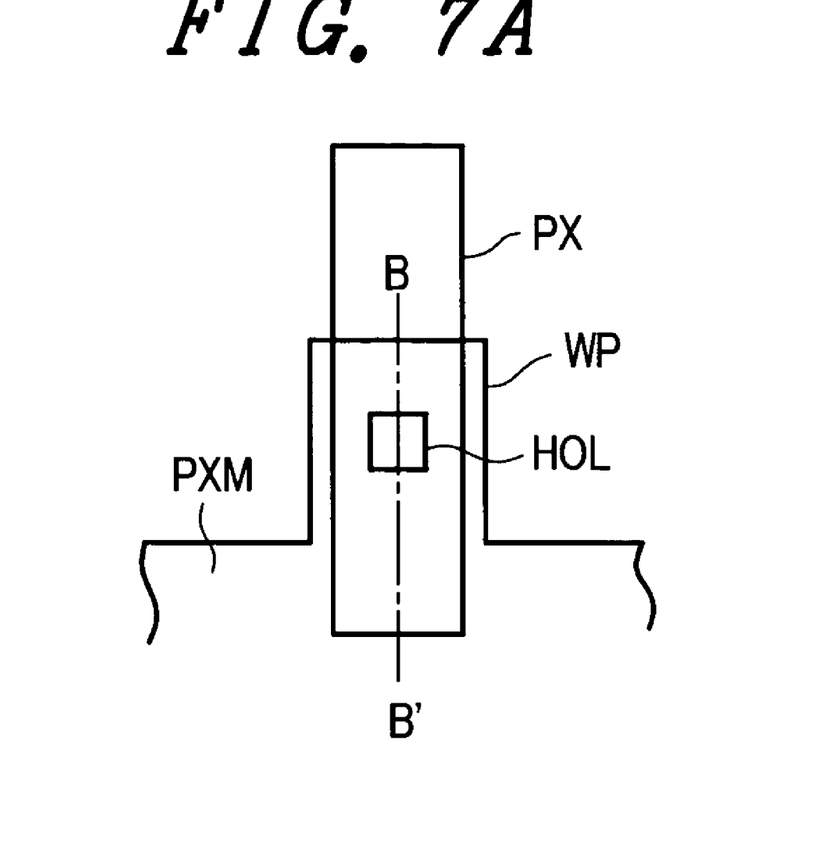
FIG. 7 is a schematic view of an essential part for explaining another example of the constitution when the short-circuit repairing is performed at a superposed portion of a transparent electrode and a projecting portion of a metal film.
Figure 7B:
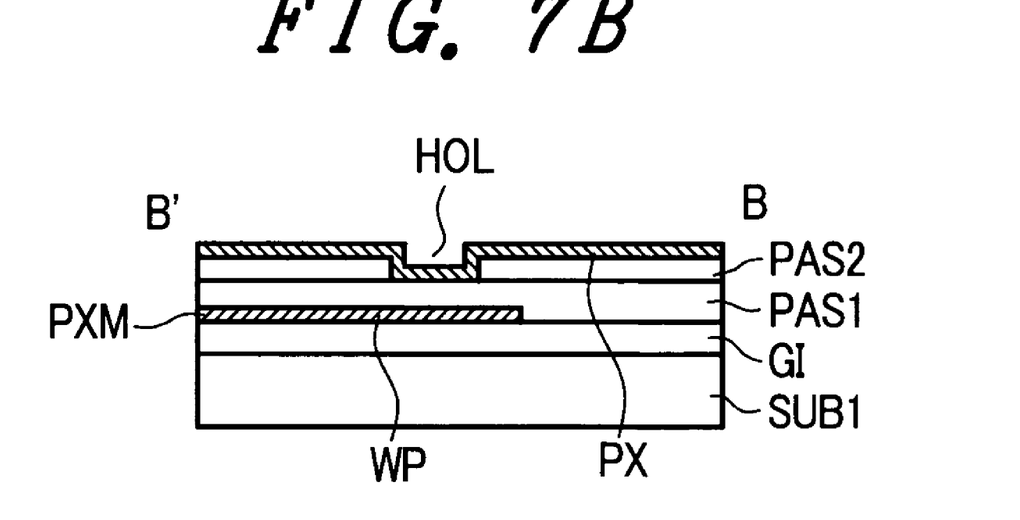

FIG. 7 is a schematic view of an essential part for explaining another constitutional example when a short-circuit repairing is performed at overlapped portion between the transparent electrode and a projecting portion of the metal film. FIG. 7(a) is a plan view and FIG. 7(b) is a cross-sectional view taken along a line B–B' in FIG. 7(a). In this constitutional example, a laminated film made of an inorganic insulation film PAS1 and an organic insulation film PAS2 is formed between the pixel electrode PX and the metal film PXM. Further, the organic insulation film PAS2 is provided with a removal portion HOL in at least a portion of an superposed portion of the projecting portion WP with the pixel electrode PX. In the drawing, reference symbol SUB1 indicates a first insulation substrate and GI indicates a gate insulation film.

The organic insulation film PAS2 has a higher volumetric expansion coefficient attributed to heat than the inorganic insulation film PAS1. Accordingly, in performing the repairing operation which evaporates the short-circuit portion by laser beam irradiation, the organic insulation film PAS2 is expanded and scattered and a portion of the organic insulation film PAS2 intrudes into the liquid crystal thus degenerating the characteristics of the liquid crystal. To prevent this phenomenon, by forming the removal portion HOL at a portion of the organic insulation film PAS2 which is at the superposed portion of the projecting portion WP with the pixel electrode PX, the expansion and scattering of the organic insulation film PAS2 in the repairing operation in which the short-circuit portion is evaporated by the laser beam irradiation can be reduced due to the presence of the removal portion HOL. As a result, the intrusion of the organic insulation film PAS2 into the liquid crystal can be obviated. The shape and the number of the removal portions HOL are not limited to the illustrated shape and number. Further, the same goes for a case in which the transparent electrodes are the common electrodes CT. By setting the width of the removal portions wider than the width of the electrodes, this advantageous effect is further enhanced.

Figure 8A:
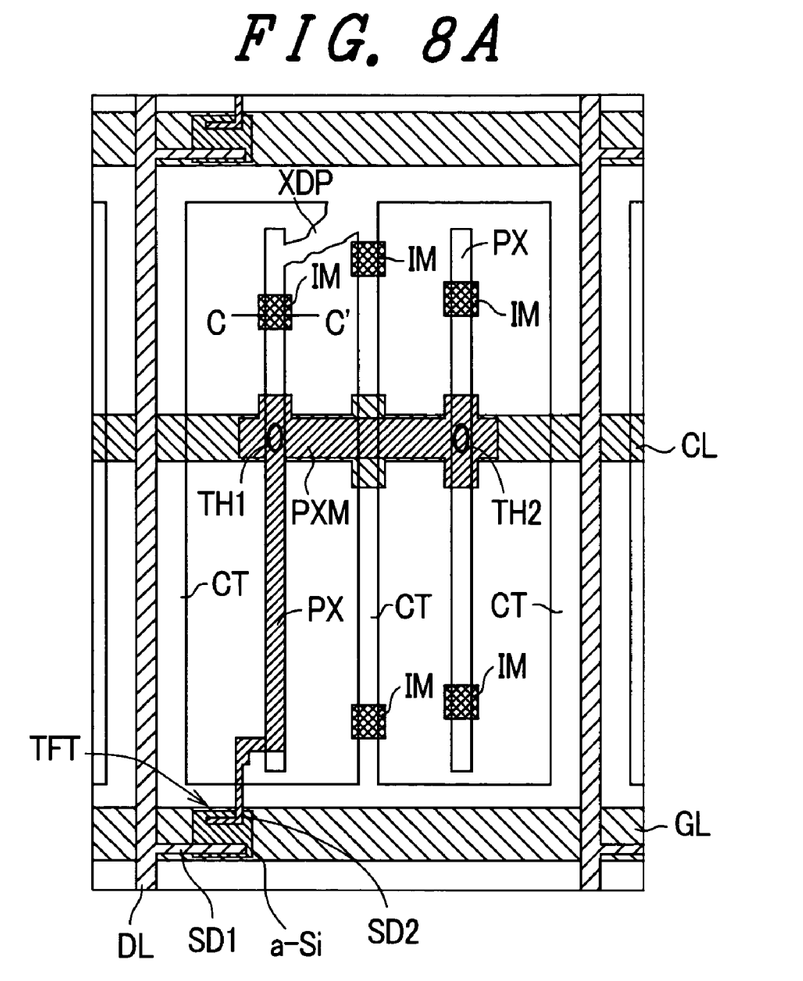
FIG. 8 is a constitutional view of the vicinity of one pixel for explaining another embodiment of the liquid crystal display device according to the present invention.
Figure 8B:
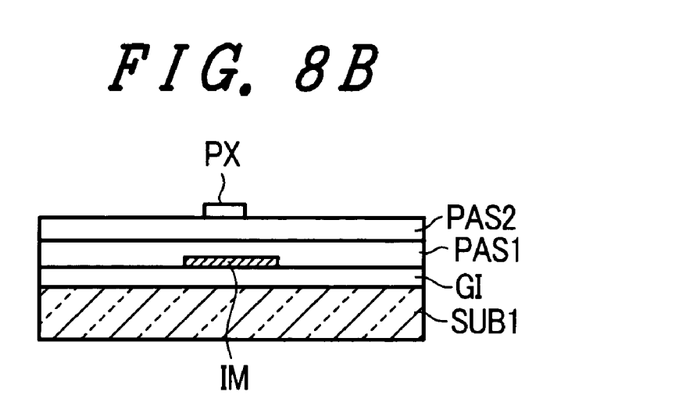

FIG. 8 is a constitutional view of the vicinity of one pixel for explaining the third embodiment of the liquid crystal display device according to the present invention, wherein FIG. 8(a) is a plan view and FIG. 8(b) is a cross-sectional view taken along a line C–C' in FIG. 8(a). In the drawing, reference symbol IM is an isolated metal film and symbols which are equal to the symbols used in the above-mentioned embodiment correspond to identical functional parts. In this embodiment, below the pixel electrode PX which constitutes the first transparent electrode, the isolated metal film IM which is not electrically connected with other electrode group is superposed by way of the insulation films (PAS1, PAS2). The same goes for the second transparent electrode CT which constitutes the common electrode.

The isolated metal film IM is formed such that a width thereof is wider than a width of the pixel electrode PX (or the common electrode CT) formed above the metal film IM. Since the isolated metal film IM can efficiently concentrate heat of laser beams irradiated from the first insulation substrate SUB1 side at the time of repairing the short-circuit portion XPD to the pixel electrode PX (or the common electrode CT), it is possible to cut the pixel electrode PX (or the common electrode CT) in a short time. Accordingly, it is possible to reduce the influence of the heat to the insulation film and other portions at the time of repairing.

Figure 9:
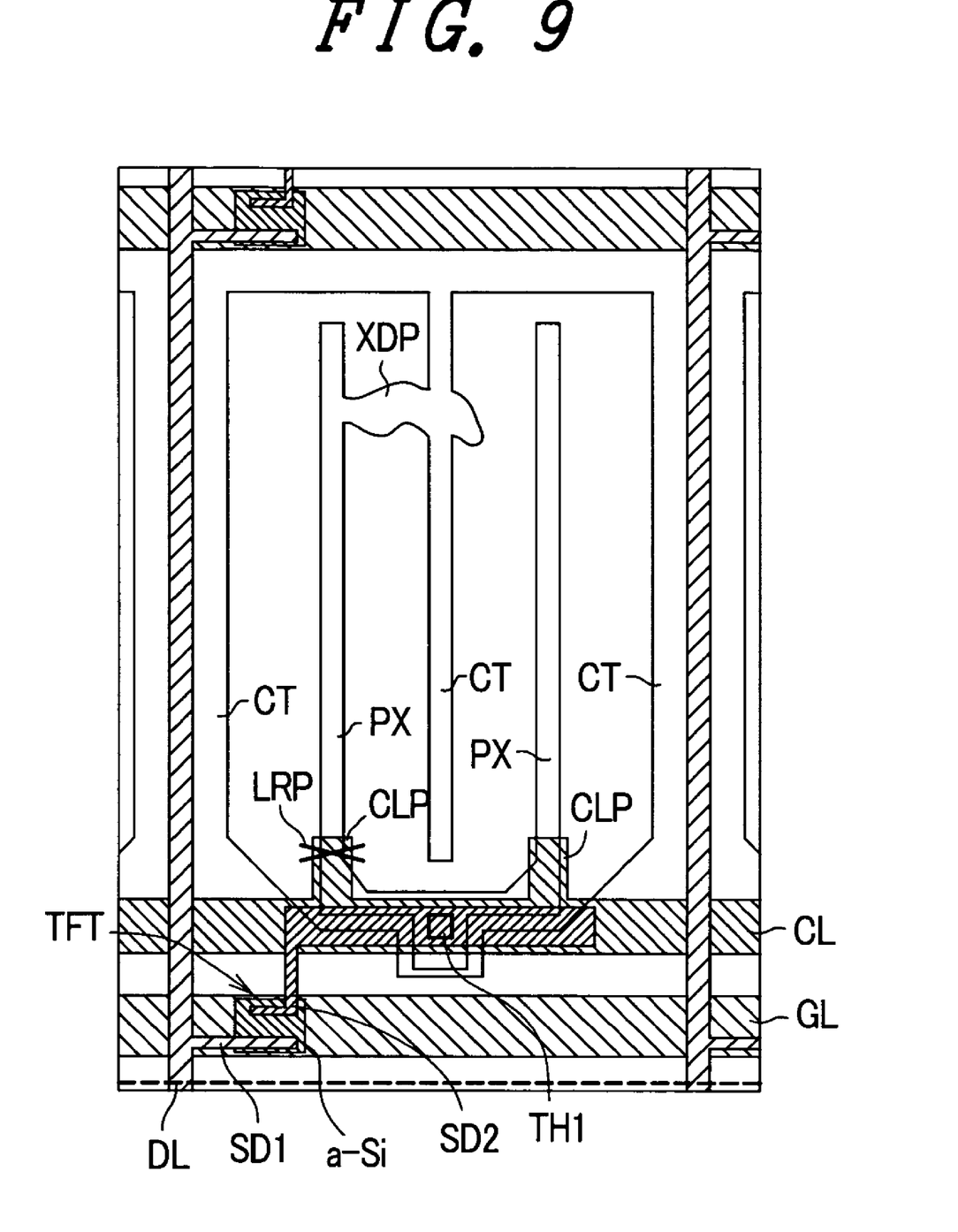
FIG. 9 is a constitutional view of the vicinity of one pixel for explaining another embodiment of the liquid crystal display device according to the present invention.

FIG. 9 is a constitutional view of the vicinity of one pixel for explaining the fourth embodiment of the liquid crystal display device according to the present invention. This embodiment is characterized in that on the common signal line CL, a projecting portion CLP which is superposed on the pixel electrode PX and projects in the extending direction of the pixel electrode PX is formed such that a width of the projecting portion CLP is wider than a width of the pixel electrode PX. In repairing a short-circuit portion XDP, a laser irradiation position indicated by "x" is cut by the laser beam irradiation. Here, a source electrode SD2 of the thin film transistor is connected to the pixel electrode PX via the through hole TH1. In such a constitution, although the common signal line CL is arranged close to the scanning signal line GL and is formed at a portion which is covered with a black matrix not shown in the drawing, in the same manner as the above-mentioned embodiment, the common signal line CL is formed in the pixel region and the projecting portion CLP is formed on the common signal line CL. Also in this embodiment, it is possible to repair the short-circuit defect and to obtain the liquid crystal display device with no point defect.

Figure 10:
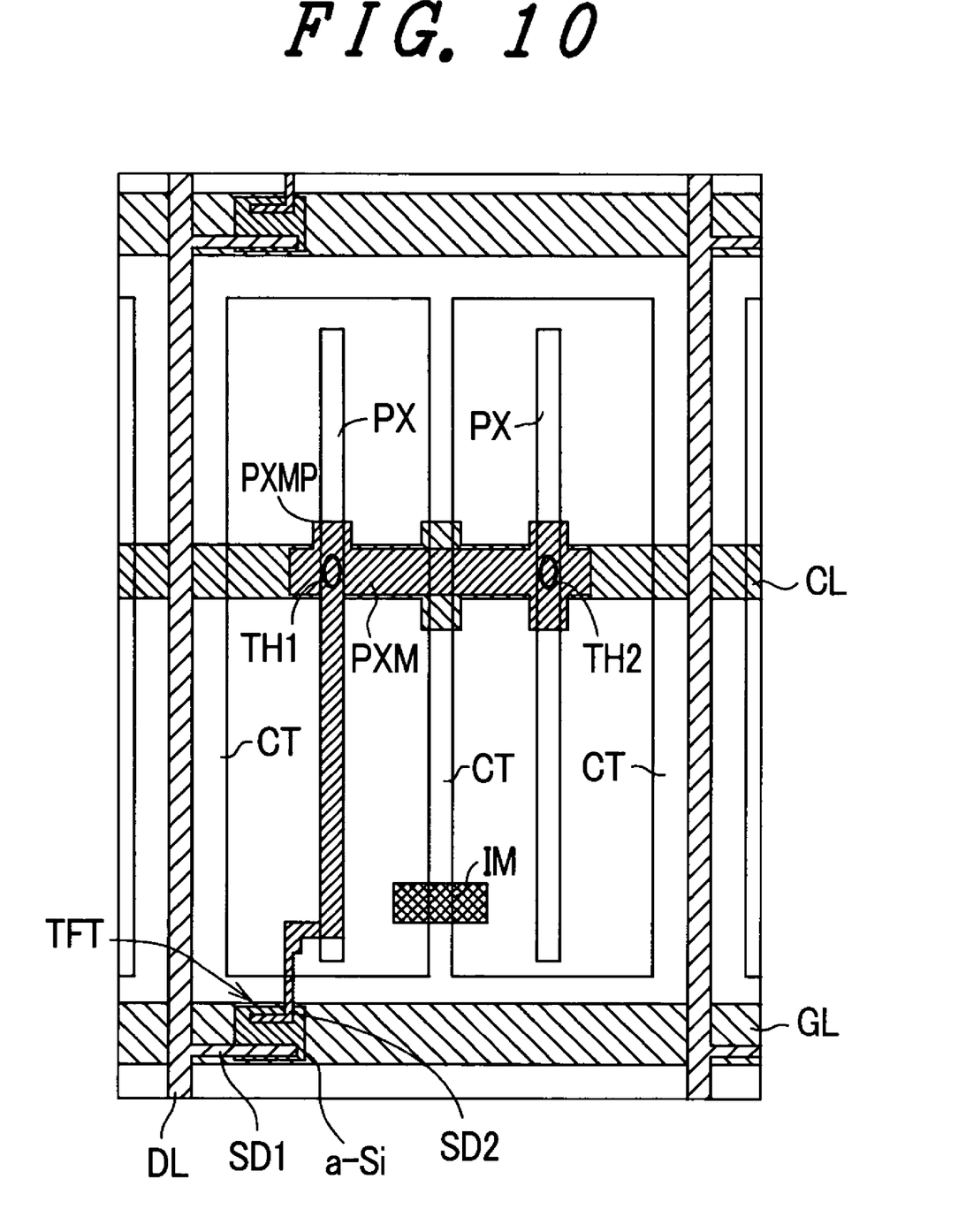
FIG. 10 is a constitutional view of the vicinity of one pixel for explaining another embodiment of the liquid crystal display device according to the present invention.

FIG. 10 is a constitutional view of the vicinity of one pixel for explaining the fifth embodiment of the liquid crystal display device according to the present invention. The embodiment is formed by combining the embodiment explained in conjunction with FIG. 1 and the embodiment explained in conjunction with FIG. 8. That is, this embodiment is provided with a metal film PXM on which a projecting portion PXMP similar to the projecting portion shown in FIG. 1 is formed and an isolated metal film IM similar to the isolated metal shown in FIG. 8. Other constitutions and advantageous effects are substantially equal to the corresponding constitutions and advantageous effects explained in conjunction with FIG. 1 and FIG. 8.

As has been explained heretofore, according to the present invention, in repairing the short-circuit of the transparent electrodes which constitute the pixel electrodes and the common electrodes by the laser beam irradiation, it is possible to cut the short-circuit portion rapidly. Further, it is possible to repair only the region to be originally cut by suppressing the evaporation of the insulation film below the short-circuit portion whereby the yield rate can be enhanced.

What is claimed is:

1. A display device, comprising:
a pixel electrode and a common electrode formed in the same layer;
a metal heat diffusion member formed in a layer different from the layer in which the pixel electrode and the common electrode are formed, the heat diffusion member having a projecting portion at a portion thereof remoter than a distance between the heat diffusion member and a thin film transistor;
an electrode residue which short-circuits the pixel electrode and the common electrode as the pixel electrode and the common electrode are formed; and
a laser beam irradiated void on the projecting portion of the heat diffusion member and a simultaneously-formed laser beam irradiated void on the pixel electrode, the voids electrically insulating the pixel electrode from the common electrode after the pixel electrode and the common electrode are short-circuited,
wherein the heat diffusion member is superposed on the pixel electrode or the common electrode at the projecting portion, and
wherein an inorganic insulation film and an organic insulation film are provided between a layer on which the heat diffusion member is formed and the layer in which the pixel electrode or the common electrode are formed, and the organic insulation film has a removed portion at least at the superposed portion between the heat diffusion member and the pixel electrode or the common electrode.

2. A liquid crystal display device, comprising:
thin film transistors, scanning signal lines, data signal lines which are arranged in a state that the data signal lines intersect the scanning signal lines, a pixel electrode electrically connected to an output electrode of one of the thin film transistors, and a common electrode which forms an electric field between the common electrode and the pixel electrode;
a pixel region which is surrounded by neighboring two of the scanning signal lines and neighboring two of the data signal lines;
a metal heat diffusion member disposed in a spaced apart manner from the thin film transistor, the heat diffusion member having a projecting portion which is remoter than a distance between the thin film transistor and the heat diffusion member;
an electrode residue which short-circuits the pixel electrode and the common electrode as the pixel electrode and the common electrode are formed; and
a laser beam irradiated void on the projecting portion of the heat diffusion member and a simultaneously-formed laser beam irradiated void on the pixel electrode, the voids electrically insulating the pixel electrode from the common electrode after the pixel electrode and the common electrode are short-circuited,
wherein the projecting portion of the heat diffusion member is superposed with a transparent electrode, and the transparent electrode is one of the pixel electrode and the common electrode,
the pixel electrode and the common electrode are formed in the same layer, and
an inorganic insulation film and an organic insulation film are provided between a layer on which the heat diffusion member is formed and the layer in which the pixel electrode and the common electrode are formed, and the organic insulation film has a removed portion at least at the superposed portion between the heat diffusion member and the transparent electrode.

* * * * *